Sept. 9, 1969  E. F. HOLDEN  3,465,719

APPARATUS FOR AUTOMATICALLY FEEDING FISH

Filed June 7, 1967

INVENTOR.
EDWARD F. HOLDEN

BY
Olsen and Stephenson
ATTORNEYS

United States Patent Office

3,465,719
Patented Sept. 9, 1969

3,465,719
APPARATUS FOR AUTOMATICALLY FEEDING FISH
Edward F. Holden, 602 Eberwhite Blvd.,
Ann Arbor, Mich. 48103
Filed June 7, 1967, Ser. No. 644,359
Int. Cl. A01k 61/02, 63/00, 64/00
U.S. Cl. 119—5                  5 Claims

ABSTRACT OF THE DISCLOSURE

A fish feeding device in which a floatable container for five fish food is equipped with a wick so that when the container is floated in an aquarium, water from the aquarium slowly enters the container through the wick so that the container gradually descends in the aquarium at a predetermined rate. The container is provided in one side wall with an opening so that when the container has descended to a level at which the water therein communicates with the side wall opening, the live food within the container can travel out of the container through the opening for consumption by the fish in the aquarium.

Background of the invention

This invention relates to the same type of fish feeding device disclosed in applicant's prior U.S. Patent No. 3,260,238 in that it utilizes a floatable container equipped with a wick so that the container will gradually descend in the aquarium in which it is placed. The fish feeder disclosed in the aforementioned patent is adapted primarily for feeding dry fish food which will float when it comes in contact with the water surface in the aquarium. The apparatus of this invention provides for improved live food feeding in that it automatically dispenses live food to the fish at controlled periods of time.

Summary of the invention

The apparatus for automatically feeding fish of this invention includes a buoyant container, a wick inserted through an opening in the bottom of the container so that water will slowly seep into the container throughout the feeding period, and one or more openings in the container wall through which live food in the container can escape into the aquarium for consumption by the fish therein. In use, the desired quantity of live food is placed in the container with sufficient water to maintain the food. The container is then floated on the surface of the aquarium water which will then slowly seep through the absorbent wick into the container causing it to gradually descend into the water. When the container has descended to a level at which the water level therein reaches the opening in the container wall, some of the live food in the container will travel through the opening into the aquarium water outside of the container, there to be consumed by the fish. The size, configuration, and number of openings in the container wall can be regulated to provide for escape of the live food over short, extended, or interrupted periods of time. Also, the amount of water initially placed in the container can be adjusted to provide for escape of the live food after the lapse of a predetermined time period following initial floating of the container on the aquarium water.

The feeding apparatus of this invention is thus usable to feed aquarium fish throughout a one day period, with only a single loading of the container, or to feed the fish over a period of several days with only one initial loading of the container. It can also be used to automatically feed live food at a selected later time period. This enables a more natural continual feeding of the captive fish, and enables the aquarist to leave his aquarium untended over a period of time. Thus, the apparatus of this invention enables the sustaining of healthier fish with less work and trouble on the part of the aquarist.

It is an object of this invention, therefore, to provide improved apparatus for automatically feeding live food to fish.

Further objects, features and advantages of this invention will become apparent from a consideration of the following description, the appended claims, and the accompanying drawing in which:

Figure 1:
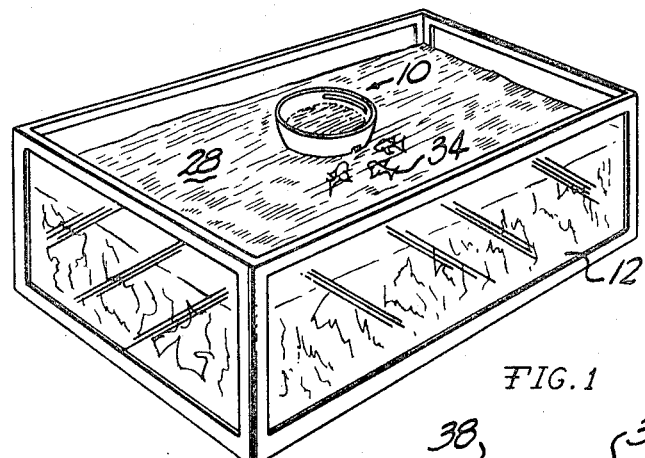
FIGURE 1 is a perspective view of an aquarium showing one form of the feeding apparatus of this invention floating in the aquarium.
Figures 2, 4, 5:
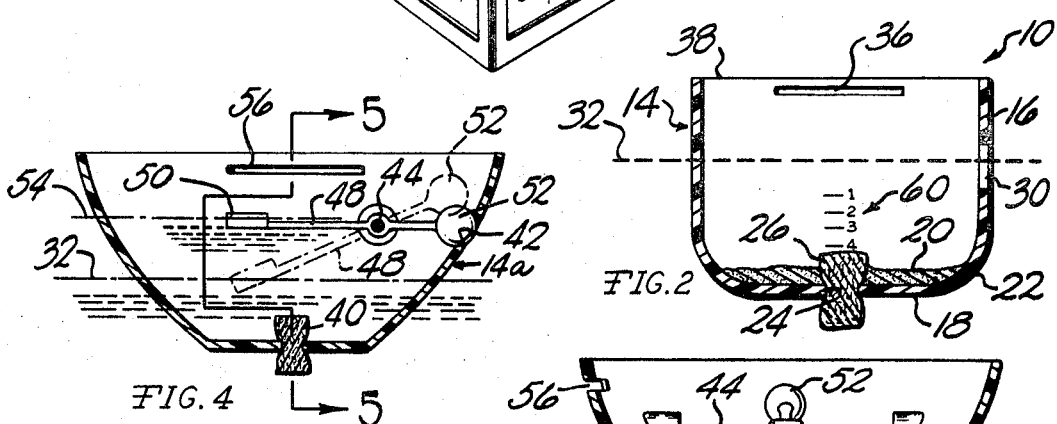
FIGURE 2 is a transverse sectional view of the feeding device shown in FIG. 1.
FIGURE 4 is a transverse sectional view of the form of the invention shown in FIG. 3, as seen from substantially the line 4—4 in FIG. 3.
FIGURE 5 is a transverse sectional view of the apparatus shown in FIG. 4 as seen from substantially the line 5—5 in FIG. 4.

With reference to the drawing, one form of the feeding device of this invention, indicated generally at 10, is illustrated in FIG. 1 floating in an aquarium 12. The device 10 includes a container 14 having a substantially upright side wall 16 and a bottom wall 18. The container 14 is preferably formed of a lightweight polyethylene material, which is lighter than water. The container 14 can also be formed of a very lightweight material, such as polystyrene having a specific gravity of approximately 0.05, in which case the container is initially partially filled with a material 20, such as sand, for stability purposes, as shown in FIG. 2. It has been found that a container formed of such a light-weight material partially filled with sand is very stable when floated in water. The bottom wall 18 is flat in order to equalize distribution of water in the container 14 in the initial stages of seepage. The relatively small height of the container 14 in relation to its diameter, with the side wall 16 tapering, as shown at 22, at its junction with the bottom wall 18 prevents tilting of the container 14 in the water.

The bottom wall 18 is formed with an opening 24 in which a wick 26 of absorbent material such as felt, cotton, foamed plastic material or the like, is placed so that it communicates with the water body 28 in which the container 14 is placed and with the interior of the container 14. The function of the wick 26 is to provide for a slow seepage of water from the body 28 into the interior of the container 14 to thereby increase the weight of the device 10 and cause it to descend gradually into the aquarium 12. The container side wall 16 is fomed with at least one opening 30 which can be of any desired shape. The purpose of the opening is to communicate the interior of the container 14 with the water body 28 when the container 14 has descended to a point at which the water level 32 is at the level of the opening 30. At this time, there is a communication between the water in the interior of the container 14 and the water body 28 outside of the container, so that live food, such as live shrimp, diphnia, etc., initially placed in the interior of the container 14 can travel through the side wall opening 30 into the aquarium 12, there to be consumed by the fish, indicated at 34, in FIG. 1.

The container 14 is also illustrated as being provided with a slot shape opening 36 adjacent the top end 38 of the container. The purpose of the opening 36 is to provide for a final communication of the water in the container 14 with the water outside the container 14 when the container has descended to its final settling level. In other words, the container 14 can be formed of a material, and/ or can be provided with a quantity of sand 20, such that it will reach its final settling level at a point at which the opening 36 is at the level of the water 28 in the aquarium 12. It is to be understood, however, that the container 14 can also reach its final level at the opening 30. The purpose of the opening 36 is to provide another opening at the water surface through which the food in the container can travel into the aquarium when the container 14 has reached its final settling level.

Figure 3:
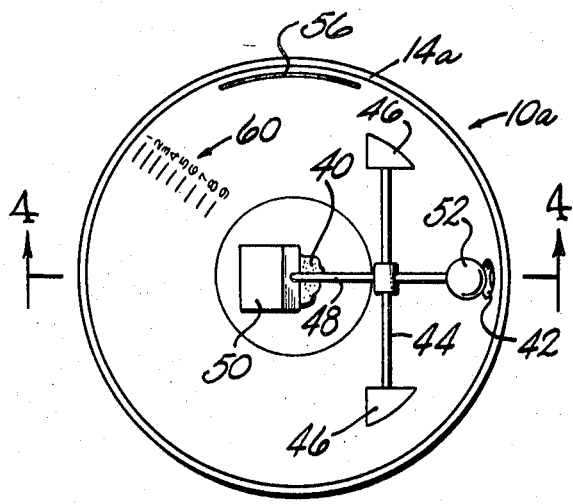
FIGURE 3 is a plan view of a modified form of the feeding apparatus of this invention.

In the modified form of the device of this invention, indicated generally at 10a, illustrated in FIGS. 3–5, inclusive, a container 14a has a wick 40 and a side wall opening 42. A shaft 44, mounted on supports 46 on the container 14a has a rod 48 mounted thereon. A float 50 is attached to one end of the rod 48 and a plug 52 is attached to the opposite end. As shown in broken lines in FIG. 4, when the water level 32 is below the opening 42, the plug 52 is spaced from the opening 42. However, when the water level within the container 14a has risen to the level indicated at 54, which is substantialy above the lower end of opening 42, the float 50 has been moved to a position in which it moves the plug 52 into a position closing the opening 42. As a result, the container 14a will then continue to descend slowly in the water until it reaches its final settling level at which the water level is at an opening 56.

In the use of the device 10a, live food and at least enough water to keep the food alive, are placed in the container 14a on the bottom wall thereof, and the container 14a is floated on the aquarium surface. The wick 40 provides for a seepage of water into the container 14a at a controlled rate so that the container slowly descends in the water body 28. When the water level 32 in the container reaches the opening 42, some of the live food will travel through the opening 42 to be consumed by the fish. The remainer of the food will remain in the container.

When the water in container 14a reaches the level 54, the plug 52 will be moved by the float 50 to a position closing the opening 42, to thereby retard the rate at which the container 14a descends since water can then enter container 14a only through the wick 40. Fish feeding is thus suspended until the container 14a reaches its final level where the water level is at opening 56. At such time the remaining food in container 14a can exit through opening 56 over a period of time.

In both the containers 14 and 14a, graduations 60 are provided to indicate the level to which the container can be initially filled with water or sand to provide for feeding at a predetermined time thereafter.

From the above description, it is seen that this invention provides live food fish feeding apparatus which is very versatile in use in that it can be adapted for almost any desired fish feeding program without the attendance of the aquarist. The wick, in both embodiments of the invention, is frictionally supported on the container bottom wall so it extends through the bottom wall opening, and as a result the wick can readily be removed for washing to remove algae or other aquarium deposits. In all instances, the containers 14 and 14a are preferably made of a plastic material having a lower specific gravity than water so that they will not sink to the bottom of the aquarium at the end of the feeding cycle. The containers 14 and 14a can be made in different sizes to adapt them to different size aquariums and different size fish. As the container 14 or 14a gradually descends into the aquarium water, there is less head between the aquarium water outside the container and the water inside the container so that the rate of descent of the container decreases as it descends further into the water. Thus different rates of dispensing food can be obtained by commencing the feeding cycle with different initial amounts of water in the container. The graduation 60 can be adapted to this purpose in specific instances. In the case of the device 10a, intermittent feeding can be performed over a long period of time.

What is claimed is:

1. Apparatus for automatically feeding fish after a time delay comprising a floatable live food container having a bottom wall and at least one upright side wall means in said bottom wall for admitting water at a controlled rate to the interior of said container, whereby on floating of said container in a water body, said container will gradually descend in said body as water therefrom is admitted to said container through said means in the bottom wall thereof, means forming at least one live food egress opening in said side wall disposed a predetermined distance above said bottom wall, said opening constituting exit means to permit the live wood to travel out of said container through the opening as the container descends below the surface of the water to a level at which the water in said container communicates with said opening.

2. Apparatus according to claim 1 wherein said container has two openings in said side wall spaced apart a predetermined distance in a vertical direction.

3. Apparatus according to claim 2 wherein the upper one of said openings is located substantially at water level when said container has descended to its final position in said water body.

4. Apparatus according to claim 2 wherein the upper one of said openings is in the form of a slot.

5. Apparatus according to claim 3 further including plug means movably mounted in said container, and float means connected to said plug means so as to move said plug means into a position closing the lower one of said side wall openings when a predetermined water level has been attained in said container.

References Cited

UNITED STATES PATENTS

| 2,711,714 | 6/1955 | Timeus | 119—5 |
| 2,718,211 | 9/1955 | Pettas | 119—5 X |
| 3,095,852 | 7/1963 | Goldman | 119—5 X |
| 3,260,238 | 7/1966 | Holden | 119—5 |
| 3,327,686 | 6/1967 | Holden | 119—5 |

ALDRICH F. MEDBERY, Primary Examiner

U.S. Cl. X.R.

119—3